(12) United States Patent
Waymire

(10) Patent No.: US 8,267,117 B2
(45) Date of Patent: Sep. 18, 2012

(54) FUEL SHUTOFF VALVE

(76) Inventor: Evan Waymire, Oregon City, OR (US)

( * ) Notice: Subject to any disclaimer, the term of this patent is extended or adjusted under 35 U.S.C. 154(b) by 395 days.

(21) Appl. No.: 12/378,877

(22) Filed: Feb. 20, 2009

(65) Prior Publication Data

US 2009/0224194 A1 Sep. 10, 2009

Related U.S. Application Data

(60) Provisional application No. 61/066,799, filed on Feb. 22, 2008.

(51) Int. Cl.
*F16K 11/085* (2006.01)
*F16K 5/04* (2006.01)
*F16L 41/16* (2006.01)

(52) U.S. Cl. ............. 137/595; 137/625.19; 285/190

(58) Field of Classification Search .......... 137/595, 137/625.19, 266, 625.47; 285/190
See application file for complete search history.

(56) References Cited

U.S. PATENT DOCUMENTS

| | | | | | |
|---|---|---|---|---|---|
| 1,625,575 | A | * | 4/1927 | Simpson | 261/73 |
| 1,732,109 | A | * | 10/1929 | Phelps et al. | 222/263 |
| 3,698,428 | A | * | 10/1972 | Gastin | 137/595 |
| 4,312,372 | A | * | 1/1982 | Amos et al. | 137/266 |
| 4,569,236 | A | * | 2/1986 | Kitchen et al. | 73/863.31 |
| 4,880,032 | A | * | 11/1989 | Doutt | 137/625.19 |
| 6,240,941 | B1 | * | 6/2001 | Small et al. | 137/1 |
| 7,010,411 | B2 | * | 3/2006 | Bond et al. | 701/78 |

* cited by examiner

*Primary Examiner* — Craig Schneider
*Assistant Examiner* — Atif Chaudry
(74) *Attorney, Agent, or Firm* — Ingrid McTaggart

(57) ABSTRACT

A fuel shutoff valve system including a body, a first fluid flow path extending through the body, a second fluid flow path extending through the body, the second fluid flow path separate from the first fluid flow path, and a single shaft that extends through at least a portion said the fluid flow path and through at least a portion of the second fluid flow path, the shaft adapted for movement between a first position and a second position, wherein in the first position the first and second fluid flow paths are open, and wherein in the second position the first and second fluid flow paths are closed.

9 Claims, 8 Drawing Sheets

FUEL SHUTOFF VALVE

This application claims priority on U.S. provisional patent application filed Feb. 22, 2008, and assigned application No. 61/066,799, in the name of the same inventor.

BACKGROUND OF THE INVENTION

Fuel tanks may include a fuel supply line for supplying fuel to an engine, and a fuel return line for returning unused fuel from the engine to the fuel tank. The fuel supply line and the fuel return line may each include a shutoff valve therein to prevent fuel flow when shutoff is desired. For safety reasons it may be desirable that the shutoff valve for the supply line and the shutoff valve for the return line both be closed or both be open and that a one-open/one-closed condition be avoided.

SUMMARY OF THE INVENTION

The present invention provides fuel shutoff valves that ensure that the fuel supply line and the fuel return line are always in the same condition, i.e., both open or both closed. A compact design is achieved by routing fuel flow through a ninety degree bend in bolts of the fuel shutoff valves.

DETAILED DESCRIPTION OF THE DRAWINGS

Fuel tanks on automobiles, such as commercial semi-tractor trailers, may include a fuel supply line for supplying fuel to an engine, and a fuel return line for returning unused fuel from the engine to the fuel tank. There may be a mirror image system on another side of the engine when two fuel tanks are utilized. The fuel supply line and the fuel return line may each include a shutoff valve therein to prevent fuel flow when shutoff is desired. For safety reasons it may be desirable that the shutoff valve for the supply line and the shutoff valve for the return line both be closed or both be open and that a one-open/one-closed condition be avoided.

Figure 1:
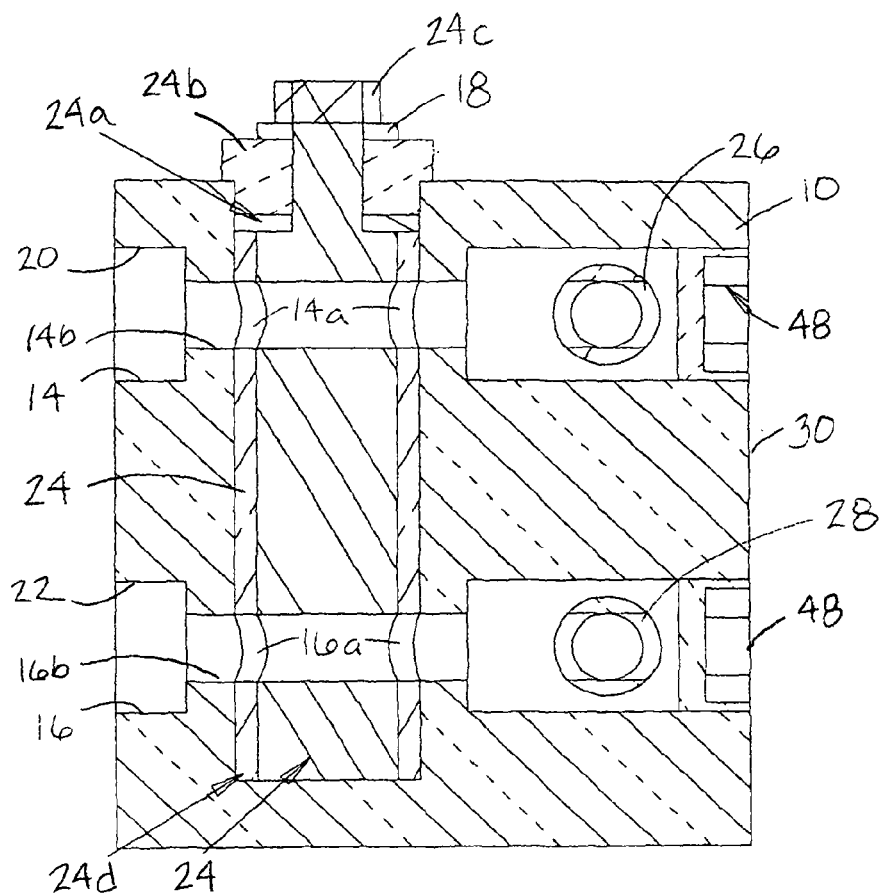
FIG. 1 is a top cross-sectional view showing internal components of one example embodiment of the fuel shutoff valve, taken along line A-A of FIG. 2.
Figure 2:
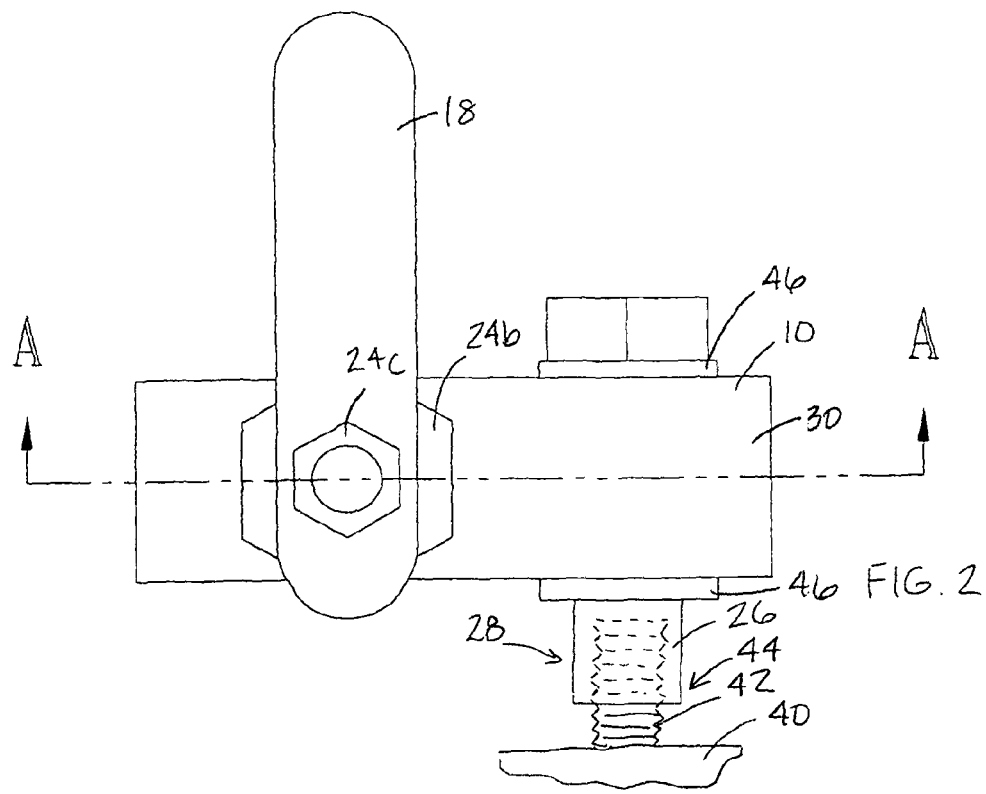
FIG. 2 is a side view of one example embodiment of the fuel shutoff valve.

FIGS. 1 and 2 are a top cross-sectional view showing internal components of one example embodiment of the fuel shutoff valve 10, and a side view of the shutoff valve 10. The fuel shutoff valve 10 is a dual plug valve including a first valve opening 14 and a second valve opening 16, which may be referred to as a supply valve opening 14 and a return valve opening 16. Both valve openings may be occluded by rotation of a single valve shaft 24 that extends through both valve openings 14 and 16. In the embodiment shown valve shaft 24 is a solid cylinder having a first set of apertures 14a aligned with a fluid flow path 14b in an open, flow condition and unaligned with fluid flow path 14b in a closed, non-flow condition, and a second set of apertures 16a aligned with a fluid flow path 16b in an open, flow condition and unaligned with fluid flow path 16b in a closed, non-flow condition. In the embodiment shown, solid cylinder 24 may have a seal 24d that surrounds an inner core of solid shaft 24. In another embodiment shaft 24 may be a hollow cylinder including a first through aperture 14a and a second through aperture 16a. In an embodiment wherein shaft 24 is hollow, a barrier may be provided within hollow shaft 24 to separate flow paths 14b and 16b. Shaft 24 may be held in a fluid tight position within valve 10 by a washer 24a and valve retainer 24b secured within valve 10.

Fluid flow paths 14b and 16b are simultaneously moved between the open, flow condition and the closed, non-flow condition with a single operating knob or lever 18. Lever 18 may be retained on shaft 24 by a fastening device, such as a nut 24c. Manual or computer controlled actuation of lever 18 simultaneously opens or closes valves 14 and 16, on the fuel supply and fuel return passages 20 and 22, respectively. In particular, both valves 14 and 16 are in fluid communication with common shaft 24 that includes sets of openings 14a and 16a that are aligned with valve openings 14 and 16. Accordingly, single shaft 24 is rotated to simultaneously open or close fluid flow pathways 14b and 16b when the valve 24 is actuated by lever 18. The shaft 24 is a quarter-turn type, so that lever 18 may rotate through only 90 degrees from the fully open, flow position to the fully closed, non-flow position.

The valve 10 is designed to attach directly to a fuel tank's 40 supply and return ports 42 and 44, respectively, without needing any hoses between the tank 40 and the valve 10. Connections between the valve 10 and the fuel tank return and supply ports 42 and 44, is accomplished through the use of banjo bolts 26 and 28. Banjo bolts 26 and 28 each pass through the valve body 30 and thread directly onto the fuel tank's supply and return ports 42 and 44 by threads 26b and 28b on an interior, respectively, of each of bolts 26 and 28. In another preferred embodiment, the threads 26b and 28b on bolts 26 and 28 may be positioned exterior of the bolts, or other fastening devices may be utilized to secure the banjo bolts directly to the fuel tank's 40 supply and return ports 42 and 44. Banjo bolts 26 and 28 may be positioned on valve body 30 with the use of crush washers 46.

By fastening valve 10 directly to the fuel tank 40 at the return and supply ports 42 and 44 of the fuel tank 40, by the use of banjo bolts 26 and 28, which define a portion of fluid flow paths 14b and 16b, respectively, the valve 10 as disclosed has the advantage of eliminating the use of a mounting bracket between the valve body 30 and the fuel tank 40, thereby reducing the cost of the system, reducing the cost and time of the installation procedure, reducing future routine maintenance costs of the system, increasing the durability of the system, and reducing the size of the system. Moreover, by fastening valve 10 directly to the fuel tank at the return and supply ports 42 and 44 of the fuel tank 40, by the use of banjo bolts 26 and 28, the valve 10 as disclosed has the advantage of eliminating the use of flexible conduits, such as fuel hoses, between the valve body 30 and the fuel tank 40, thereby reducing the cost of the system, reducing the cost and time of the installation procedure, reducing future routine maintenance costs of the system, increasing the durability of the system, and reducing the size of the system.

Figure 4:
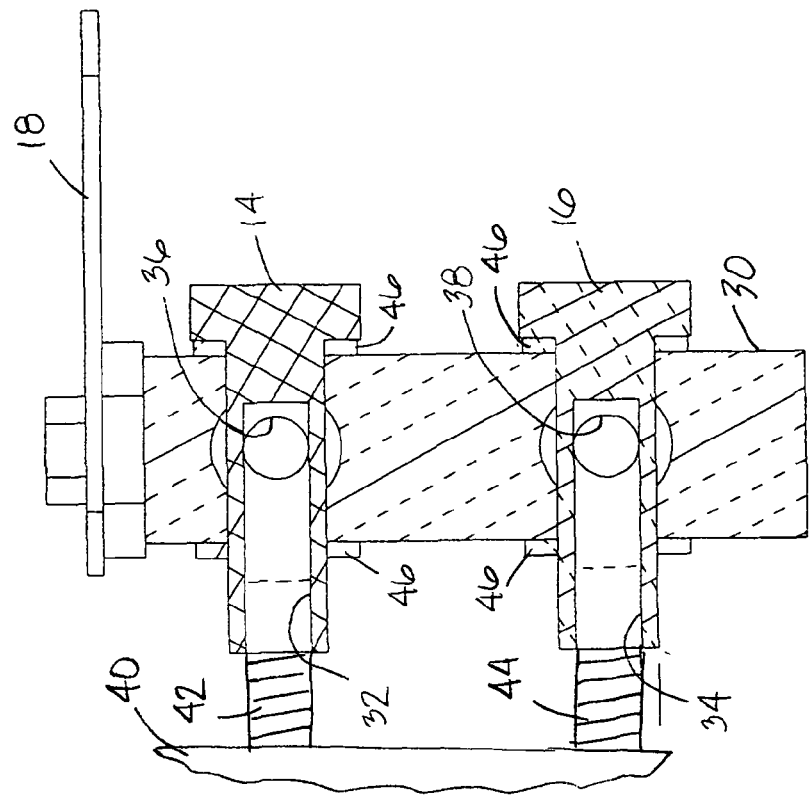
FIG. 4 is a side cross-sectional view of the fuel shutoff valve, taken along line B-B of FIG. 3.
Figure 3:
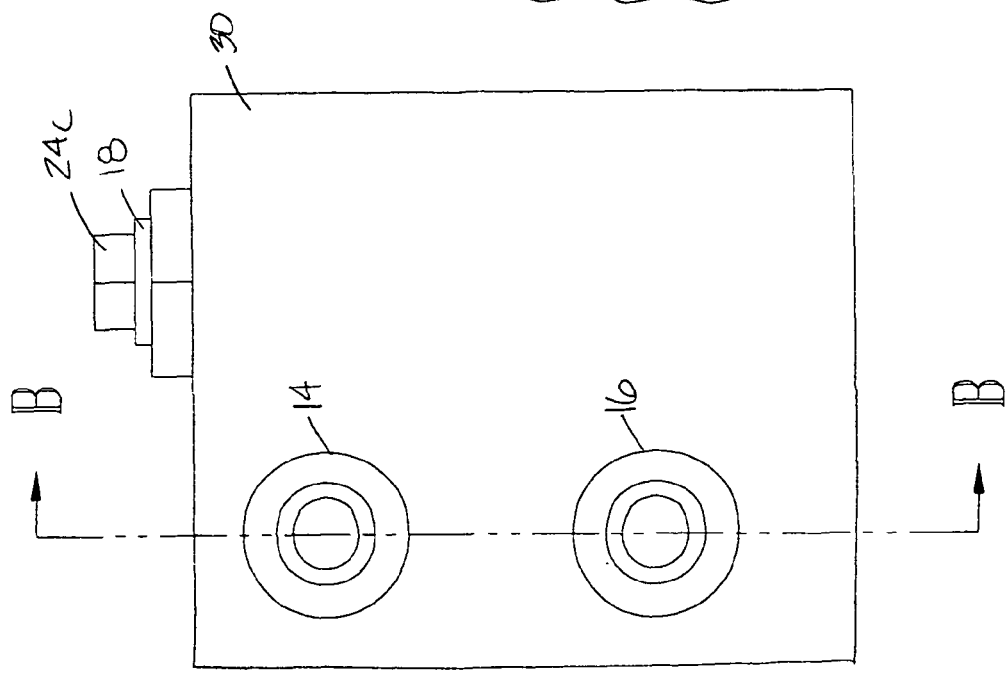
FIG. 3 is a bottom view of the fuel shutoff valve of FIG. 2.
Figure 5:
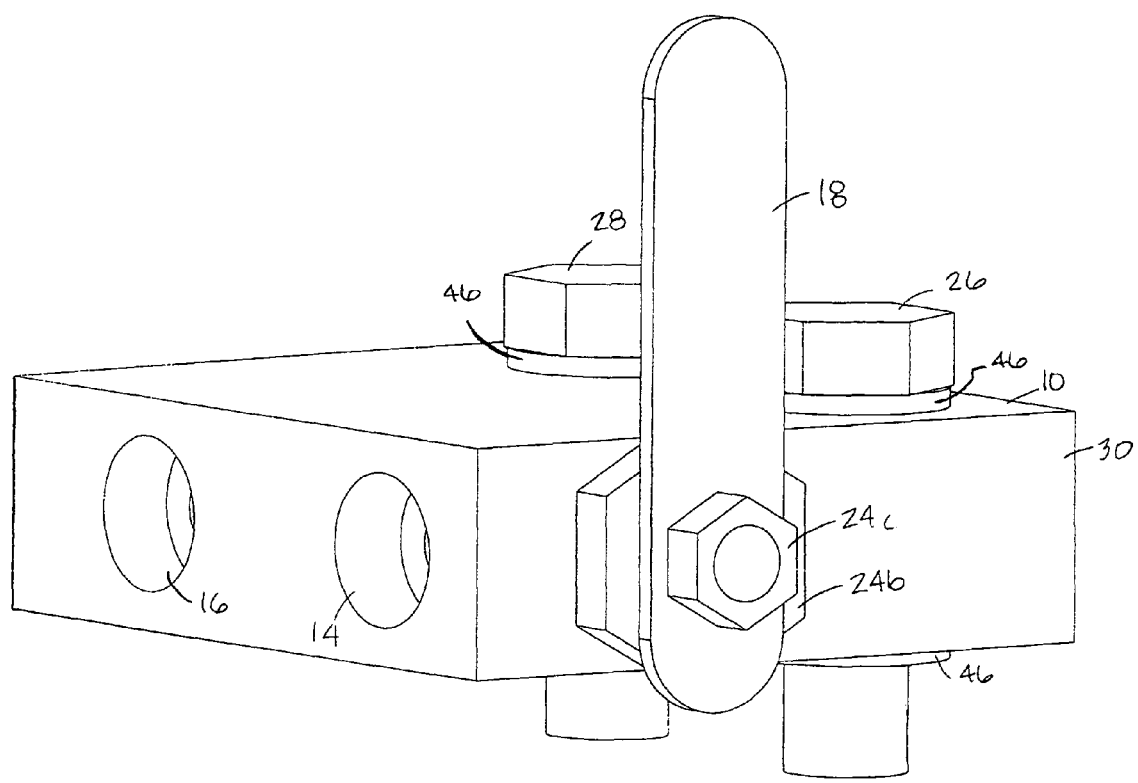
FIG. 5 is an isometric side view of the shutoff valve of FIG. 2.
Figure 6:
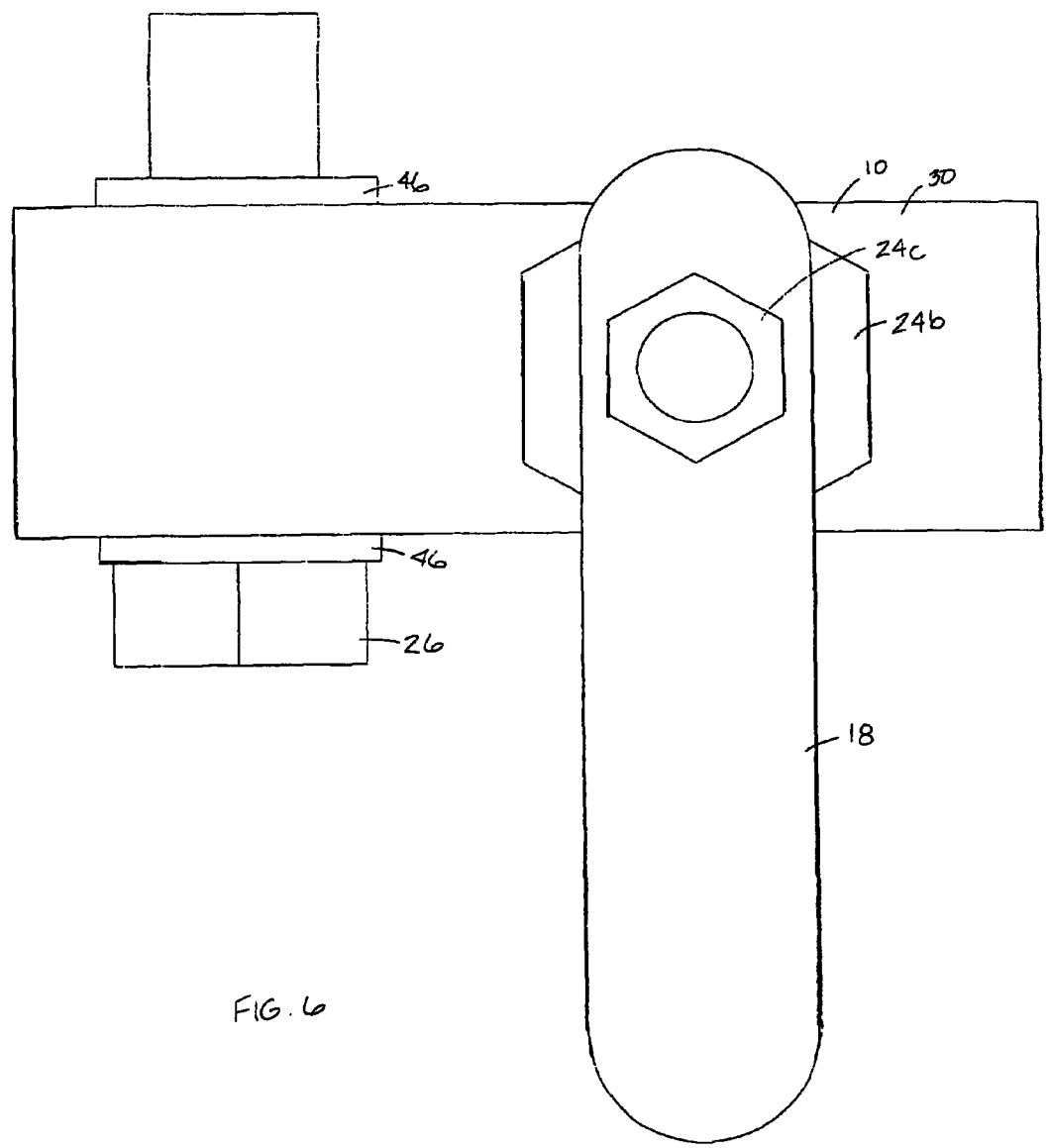
FIG. 6 is a side view of the fuel shutoff valve.
Figure 7:
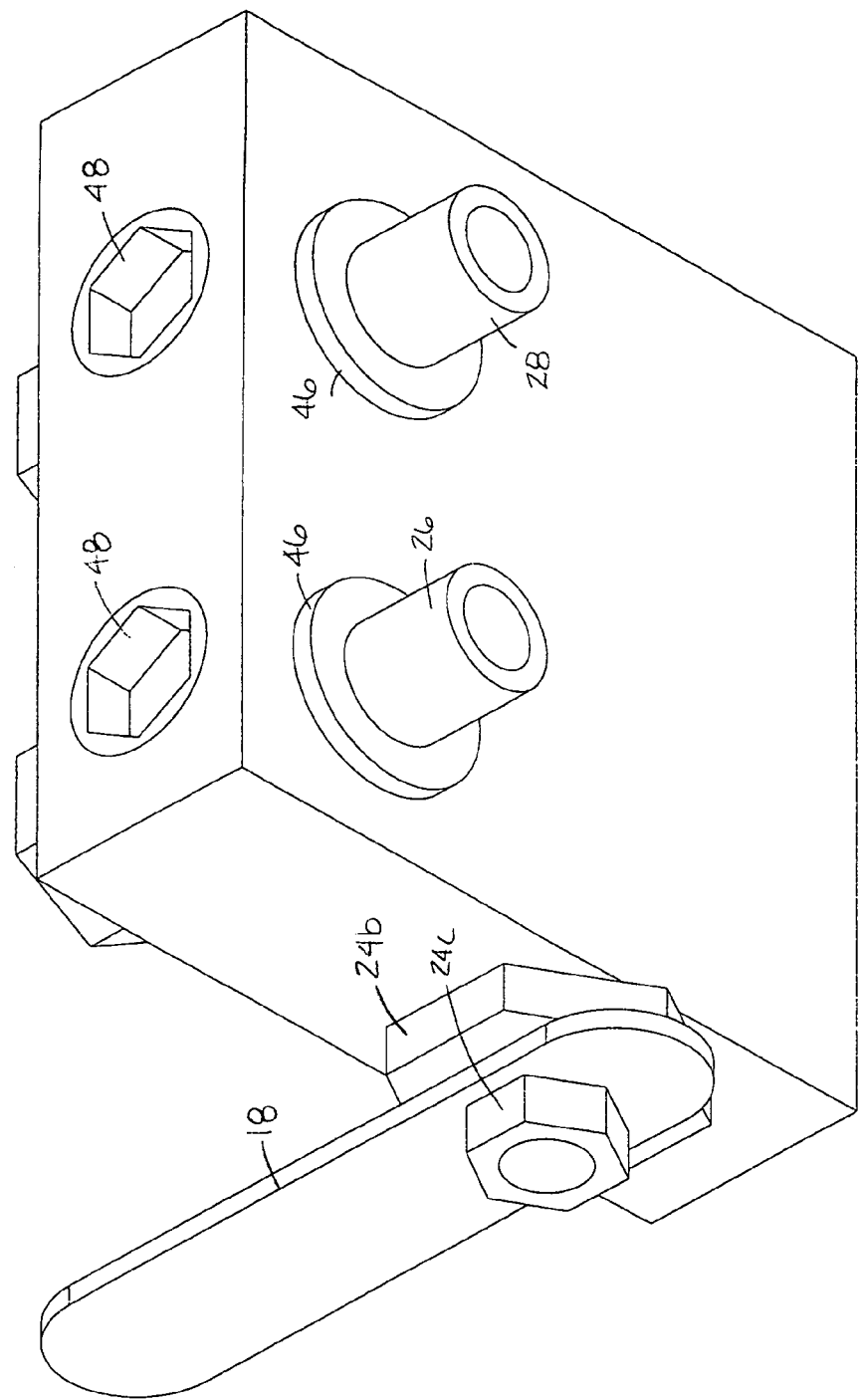
FIG. 7 is an isometric bottom view of the fuel shutoff valve.
Figure 8:
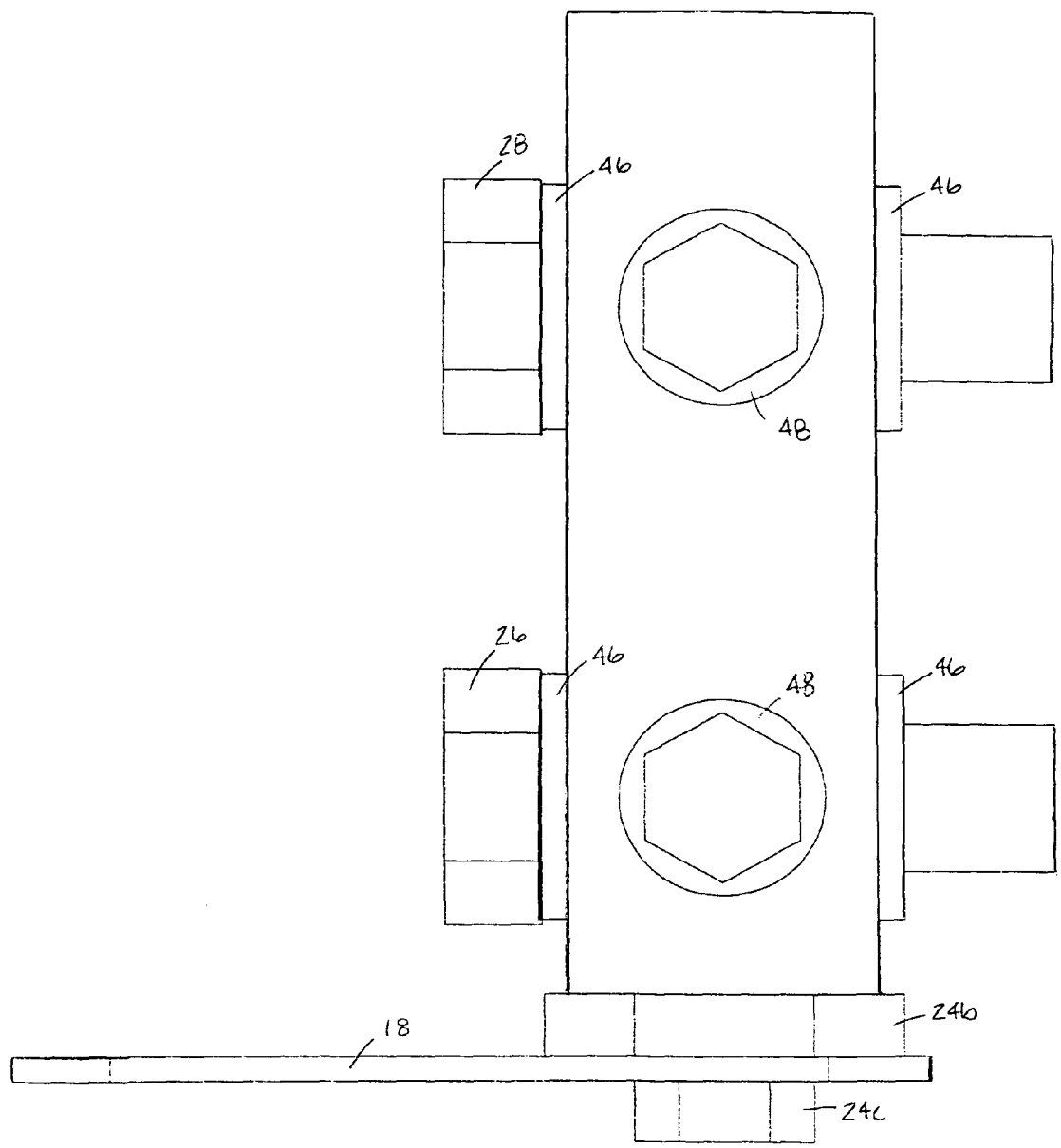
FIG. 8 is a front view of the fuel shutoff valve.
Figure 9:
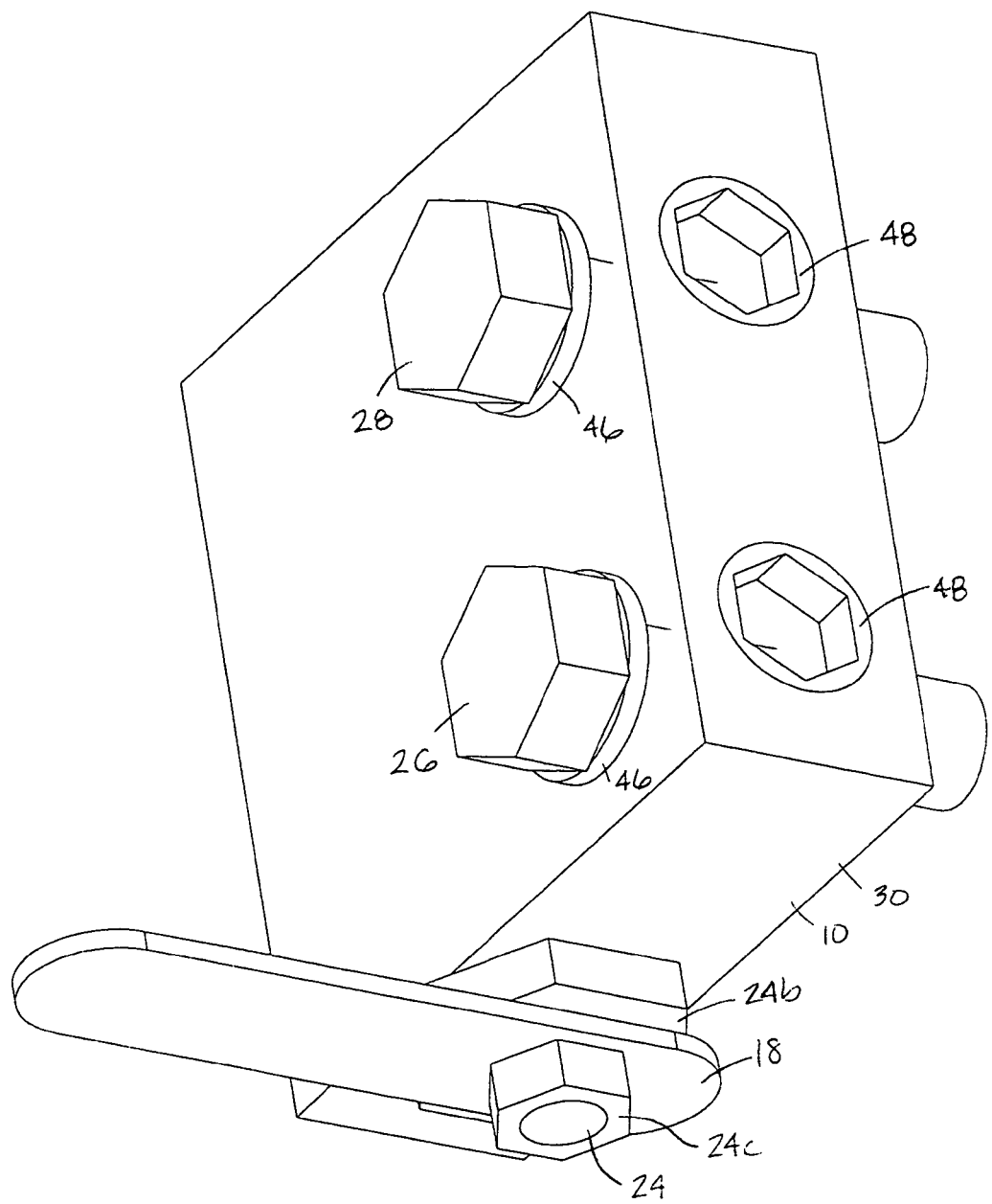
FIG. 9 is an isometric top view of the fuel shutoff valve.
Figure 10:
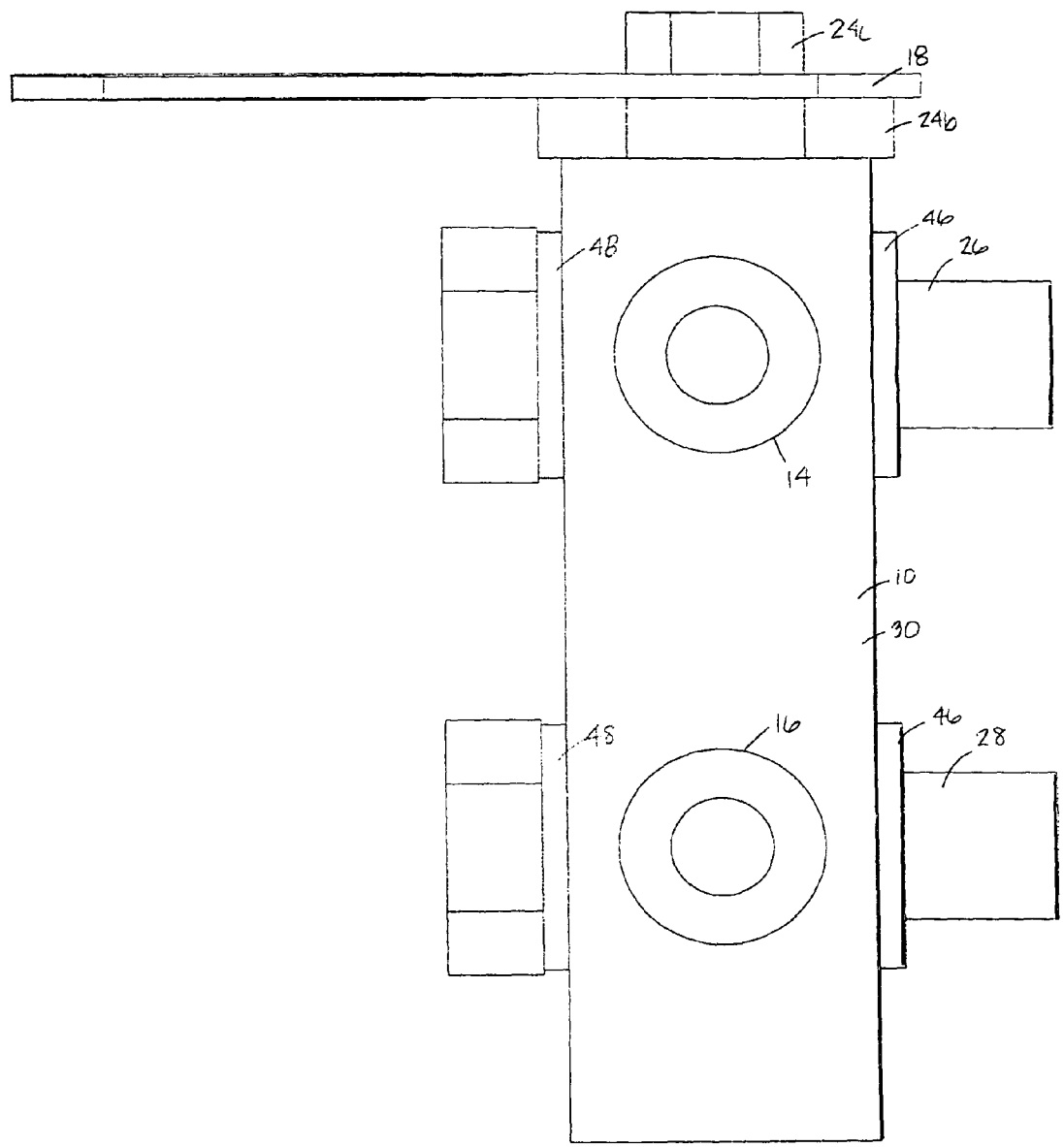
FIG. 10 is a back view of the fuel shutoff valve.

The banjo bolts 26 and 28 are drilled axially to define a hollow core of the bolt, and are drilled radially so as to define a through aperture 36 and 38, respectively, in a side of each bolt, 26 and 28, respectively, so that fuel may flow axially along the inside diameter 32 and 34 (FIG. 4) of each bolt and then turn 90 degrees to flow radially through the aperture 36 and 38, respectively, in the wall of each of the bolts 26 and 28 (FIG. 4) and thereby enter the valve body 30, and thereafter flow through valve openings 14 and 16. Fuel flow through the bolts is ensured by the use of plugs 48 positioned within fluid flow paths 14a and 16a opposite from banjo bolts 26 and 28 from first and second valve openings 14 and 16, respectively. Fuel may also flow the opposite direction, i.e., from the valve openings 14 and 16, through the valve body 30, radially into the bolts 26 or 38, and then axially down the bolt's inside diameter 32 or 34, discharging into the fuel tank's 40 supply or return port 42 or 44, respectively.

Incorporation of the multiple fluid flow paths 14a and 16a into a single valve housing 30, with a single actuated valve shaft 24, provides a stable structure for securing the valve body 30 to a fuel tank 40 without the use of mounting brackets, without the use of connection hoses, and allows a single control lever 18 to simultaneously actuate multiple fluid flow paths 14a and 16a for example, between the open position and the closed position.

FIGS. 3-10 show other views of one example embodiment of the fuel shutoff valve 10 of the present invention.

Other variations and modifications of the concepts described herein may be utilized and fall within the scope of the claims below.

I claim:

1. A method of mounting a fuel valve to a fuel tank, comprising:
providing a valve body including a first fluid pathway and a second fluid pathway therein and including a single closure device movable between a first position and a second position so as to simultaneously move each of said first fluid pathway and said second fluid pathway in said valve body between a flow condition and a non-flow condition, said first fluid pathway comprising only a first straight section and a second straight section positioned perpendicular to one another, and said second fluid pathway comprising only a first straight section and a second straight section positioned perpendicular to one another;
positioning a first hollow bolt in said valve body such that at least a portion of said first fluid pathway extends through said first hollow bolt and securing said first bolt directly to a fuel tank return port; and
positioning a second hollow bolt in said valve body such that at least a portion of said second fluid pathway extends through said second hollow bolt and securing said second bolt directly to a fuel tank supply port,
wherein said first and second bolts secure said valve body directly to said fuel tank with an absence of mounting brackets and with an absence of hoses positioned between said valve body and said fuel tank and wherein fluid flowing along said first fluid flow path flows directly between said body and said fuel supply port and such that fluid flowing along said second fluid flow path flows directly between said body and said fuel return port, and wherein said first hollow bolt defines a ninety degree bend in said first fuel flow path at a position between said first and said second straight sections, and said second hollow bolt defines a ninety degree bend in said second fuel flow path at a position between said first and said second straight sections.

2. The method of claim 1 wherein said first and second bolts each comprise a banjo bolt.

3. The method of claim 1 wherein said first and second fluid pathways are both simultaneously moved between said flow condition and said non-flow condition by rotational movement of said single closure device mounted on said valve body.

4. The method of claim 1 wherein said first and said second hollow bolts together rigidly secure said valve body to said fuel tank during flow of fuel through said first and said second fluid flow pathways and wherein each of said first and said second fastening means, respectively, define a ninety degree bend in each of said first and said second fluid flow pathways.

5. A method of controlling fuel valves on a fuel tank, comprising:
connecting a fuel return port of a fuel tank to a fuel return flow path in a valve body, said fuel return flow path consisting of only two linear sections separated by a change in direction of said fuel return flow path;
connecting a fuel supply port of said fuel tank to a fuel supply flow path in said valve body, said fuel supply flow path consisting of only two linear sections separated by a change in direction of said fuel supply flow path; and
moving a single control structure between a first position and a second position so as to simultaneously move each of said fuel return flow path and said fuel supply flow path in said valve body between a flow condition and a non-flow condition;
said fuel return port of said fuel tank connected directly to said fuel return flow path in said valve body with an absence of a flexible fluid conduit and through a first hollow bolt that defines at least a portion of said fuel return flow path and that defines a said change in direction of said fuel return flow path within said first hollow bolt, and said fuel supply port of said fuel tank connected directly to said fuel supply flow path in said valve body with an absence of a flexible fluid conduit and through a second hollow bolt that defines at least a portion of said fuel supply flow path and that defines said change in direction of said fuel supply flow path within said second hollow bolt, and wherein said valve body is connected to said fuel tank with an absence of mounting brackets.

6. The method of claim 5 wherein said control structure is connected to an elongate shaft that extends through at least a portion of said fuel return flow path and through at least a portion of said fuel supply flow path.

7. The method of claim 6 wherein said elongate shaft includes only a first and a second through aperture extending there through, said first aperture aligned with said fuel return flow path in said flow condition and unaligned with said fuel return flow path in said non-flow condition, and said second through aperture aligned with said fuel supply flow path in said flow condition and unaligned with said fuel supply flow path in said non-flow condition.

8. The method of claim 5 further comprising moving said single control structure between said second position and said first position so as to simultaneously move each of said fuel return flow path and said fuel supply flow path in said body between said non-flow condition and said flow condition.

9. The method of claim 5 wherein said first rigid, hollow bolt of said valve body is directly connected to said fuel return port and said second rigid, hollow bolt of said valve body is directly connected to said fuel supply port of said fuel tank such that said valve body is secured to said fuel tank with an absence of a mounting bracket, and with an absence of a flexible hose positioned there between so as to rigidly secure said valve body to said fuel tank during flow of fuel through said valve body and wherein each of said first and said second bolts, respectively, define a ninety degree bend in each of said fuel return and said fuel supply flow paths.

\* \* \* \* \*